United States Patent [19]

Rudolph et al.

[11] 4,161,393

[45] Jul. 17, 1979

[54] SHIFT CONVERSION OF RAW GAS FROM GASIFICATION OF COAL

[75] Inventors: Paul Rudolph, Bad Homburg; Uwe D. Marwig, Münster, both of Fed. Rep. of Germany

[73] Assignee: Metallgesellschaft Aktiengesellschaft, Frankfurt am Main, Fed. Rep. of Germany

[21] Appl. No.: 882,483

[22] Filed: Mar. 1, 1978

[30] Foreign Application Priority Data

Mar. 7, 1977 [DE] Fed. Rep. of Germany ....... 2709768

[51] Int. Cl.² ............................................. C10J 3/00
[52] U.S. Cl. .................................. 48/197 R; 48/202; 48/206; 252/373; 423/655
[58] Field of Search ..................... 48/197 R, 202, 206, 48/210, 214 R, 214 A; 423/655, 656; 273/373, 376

[56] References Cited

U.S. PATENT DOCUMENTS

| | | | |
|---|---|---|---|
| 3,010,813 | 11/1961 | Clarke et al. | 48/197 R |
| 3,061,421 | 10/1962 | Landau et al. | 48/197 R |
| 3,540,867 | 11/1970 | Baron et al. | 48/206 |
| 4,031,030 | 6/1977 | Rudolph | 48/202 |
| 4,061,475 | 12/1977 | Moller et al. | 48/197 R |
| 4,065,273 | 12/1977 | Rudolph | 48/206 |
| 4,082,520 | 4/1978 | Baron et al. | 48/202 |

FOREIGN PATENT DOCUMENTS 1400065  7/1975  United Kingdom ............. 48/197 R

*Primary Examiner*—S. Leon Bashore
*Assistant Examiner*—George C. Yeung
*Attorney, Agent, or Firm*—Sprung, Felfe, Horn, Lynch & Kramer

[57] ABSTRACT

In a process for producing a fuel gas from a solid fuel by a gasification of solid fuel under a pressure of about 15–100 bars by a treatment with steam and a gas which contains free oxygen, cooling the raw gas to a temperature of about 150°–200° C. and saturating it with water vapor, removing condensate which has formed so that the raw gas contains hydrocarbons having a boiling range from about 20° to 400° C. in an amount of about 10–100 g per standard m³ of dry gas and has a $CO:H_2O$ volume ratio of about 0.8–2, and subjecting the raw gas to a shift conversion, the improvement which comprises dividing the raw gas into first and second partial streams in a ratio of about 1:10 to 1:1, feeding the first partial stream with a surplus of water vapor to a first shift conversion stage at an inlet temperature of about 280°–450° C., and passing through a second shift conversion stage a mixture of effluent gas from the first shift conversion stage and at least part of the second partial stream of raw gas at a temperature of about 300°–500° C., while maintaining a pressure of about 15–100 bars in the shift conversion stages. Advantageously water vapor is added to the raw gas entering the first shift conversion stage in at least about 70% of the stoichiometric amount required for shift conversion of all the carbon monoxide contained in the entire raw gas.

10 Claims, 1 Drawing Figure

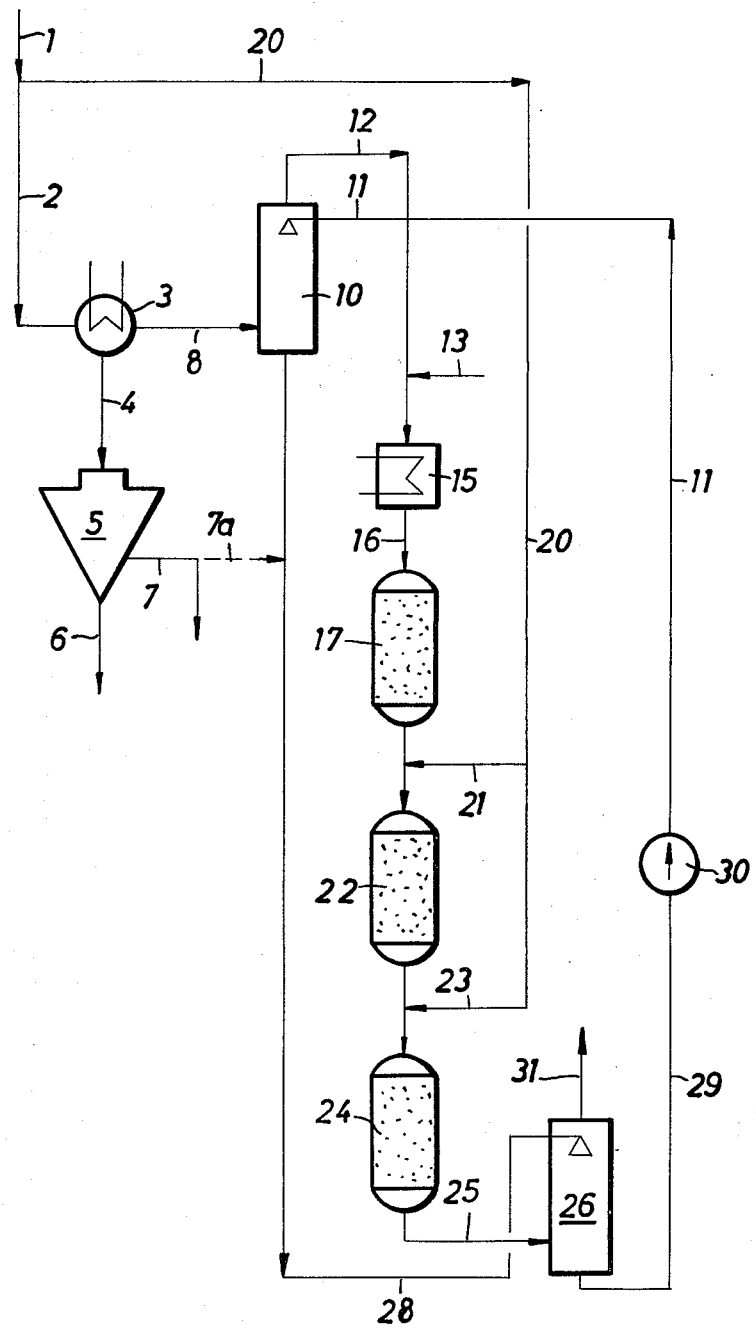

SHIFT CONVERSION OF RAW GAS FROM GASIFICATION OF COAL

This invention relates to a process of catalytically converting raw gas produced by a gasification of solid fuel under a pressure of about 15-100 bars by a treatment with steam and a gas which contains free oxygen, in which process the raw gas is first cooled to a temperature of about 150°-200° C. and saturated with water vapor, and condensate which has formed is removed so that the raw gas contains hydrocarbons having a boiling range from about 20° to 400° C. in an amount of about 10-100 g per standard m³ of dry gas and has a CO:H$_2$O volume ratio of about 0.8-2. The process results in a shift conversion of CO+H$_2$O to CO$_2$+H$_2$.

Raw gas produced by a pressure gasification of coal has an excessively high CO content and an insufficient H$_2$:CO ratio for a supply over long distances and, in many cases, for its use as synthesis gas. The CO content can be decreased by a shift conversion of the gas to which steam is being added. The addition of steam can be avoided or much reduced if the raw gas produced by the pressure gasification of coal is saturated with water vapor before it is fed to the shift conversion equipment. A raw gas of this kind may contain also tar, oil, gasoline, and phenols. Part of the sulfur content of the coal is present in the raw gas as H$_2$S and as organic sulfur compounds. Another part of the sulfur is contained in the tar products. Of these components of the raw gas, mainly the hydrocarbons (tar and oil) give rise to difficulties in the shift conversion of the gas.

U.S. Pat. No. 3,069,849 discloses a process of producing a fuel gas which has a low carbon monoxide content by a pressure gasification of coal. In that process, most of the CO content of the raw gas is converted to CO$_2$ and H$_2$ by a treatment in the presence of water vapor. The water vapor contained in the raw gas is utilized for the shift conversion. For this purpose the hot raw gas is cooled to its dew point or some degrees below its dew point, the resulting condensate is removed, and the gas is then heated to the temperature required for the shift conversion reaction and at that temperature is contacted with the shift conversion catalyst. The shift conversion is effected in a single straight pass of the entire gas through one stage or a plurality of stages. A disadvantage of the known process resides in that the life of the catalyst is relatively short.

Catalysts which are suitable for the shift conversion are known. They contain tungsten, molybdenum, nickel or cobalt in oxide or sulfide form. A commercially avilable catalyst contains cobalt and molybdenum in oxide form and is known as Comox catalyst. The catalyst is mainly used in a fixed bed.

It is an object of the invention to improve a process of the kind described first hereinbefore so that economical operation and a long life of the catalyst are ensured in spite of the presence of disturbing constituents, particularly hydrocarbons, in the gas. This is accomplished according to the invention in that the raw gas is divided into first and second partial streams at a ratio from about 1:10 to 1:1, the first partial stream with a surplus of water vapor is fed to a first shift conversion stage at an inlet temperature of about 280°-450° C. and passed through said stage, a mixture of effluent gas from the first shift conversion stage and at least part of the second partial stream of raw gas is passed at a temperature of about 300°-500° C. through at least one additional shift conversion stage, and a pressure of about 15-100 bars is maintained in the shift conversion stages.

In the first shift conversion stage, the reaction in accordance with the equation $$CO + H_2O \rightarrow CO_2 + H_2$$

in the presence of a surplus of water vapor gives rise to a relatively high hydrogen partial pressure. This hydrogen induces a hydrogenation of the hydrocarbons and particularly of the tar constituents of the raw gas so that they are subsequently virtually innocuous for the catalyst. The effluent gas from each shift conversion stage has such a high hydrogen content that considerable quantities of raw gas can be admixed to that effluent gas and can then be reacted without difficulty in the next shift conversion stage.

A hydrogen partial pressure required for a hydrogenation of the tar constituents during the shift conversion and experience has shown that the hydrogen partial pressure must be above about 5 bars for a hydrogenation of the heavy hydrogen fractions. The multi-stage shift conversion process will be controlled in such a manner in most cases that the gas entering the second stage and each subsequent stage has an H$_2$ content of about 25-35% by volume (related to moist gas). This practice will result in the desired atmosphere for hydrogenation in these shift conversion stages.

The tar content of the first partial stream of raw gas is suitably decreased before the shift conversion in that this first partial stream is cooled by at least about 10° C. and condensate is subsequently removed. The first partial stream of raw gas may be cooled to temperatures which are determined by the temperature of the cooling water or even below about 0° C. The content of tar constituents may alternatively be decreased by different means, e.g., by adsorption on activated carbon.

If the first partial stream of raw gas does not contain enough water vapor before entering the first shift conversion stage, steam is added at an adequate rate. The shift conversion product gas from the last shift conversion stage may be cooled by being sprayed with water in a cooler and the resulting cooling water may be fed to a saturator, through which the first partial stream of raw gas is passed in direct contact with the sprayed water before said first partial stream of raw gas is fed to the first shift conversion stage.

The second shift conversion stage may consist of a catalyst-containing single reactor or of two or more reactors connected in series. In accordance with a preferred feature of the invention the shift conversion is effected in at least three stages and respective parts of the second partial stream of raw gas are admixed with the effluent gases from each of the first to penultimate stages. The mixed gases fed to each of the second and subsequent shift conversion stages are maintained at a temperature in the range of about 300°-500° C., preferably below about 450° C.

In the first shift conversion stage, raw gas is reacted in the presence of such a surplus of water vapor that the water vapor amounts to at least about 70% of the water vapor which is stoichiometrically required for the shift conversion of the carbon monoxide which is present in all partial streams. The first partial stream entering the first shift conversion stage may contain at least about 100% of the total quantity of water vapor which is stoichiometrically required.

An embodiment of the process according to the invention will be explained by way of example with reference to the drawing which is a flow sheet of an apparatus for carrying out the process.

The raw gas fed to the shift conversion plant has been produced in known manner by a gasification of coal under a pressure of about 15–100 bars by a treatment with steam and a gas which contains free oxygen. Details of the pressure gasification of coal are described in U.S. Pat. No. 3,540,867. The gas which has been produced in the gasification reactor is first passed through a scrubber-cooler. This is also known from the patent and for this reason is not shown on the drawing. In the scrubber-cooler the raw gas is directly contacted with condensate-containing water to temperatures in the range of about 120°–200° C. and is saturated with water vapor at the same time. Surplus condensate is removed from the scrubber-cooler. The raw gas which has been cooled in the scrubber-cooler and flows in conduit 1 contains hydrocarbons having a boiling range of about 20°–400° C. in an amount of about 10–100 g per m³ of dry gas. The raw gas has a $CO:H_2O$ volume ratio of about 0.8–2.

For a continuous catalytic shift conversion, the raw gas flowing in conduit 1 is divided into two partial streams. The first partial stream is fed through conduit 2 to a cooler 3, in which the temperature of the gas is lowered by e.g., at least about 10° C. to about 100°–160° C. by an indirect heat exchange. Condensate formed in the cooler 3 is fed in conduit 4 to a tar separator 5, from which the tar-containing heavy phase is withdrawn in conduit 6 and aqueous condensate is withdrawn in conduit 7.

The first partial stream of raw gas is fed from cooler 3 in conduit 8 to a saturator 10 and is directly contacted in the latter with hot water from conduit 11. The raw gas which has been re-heated and enriched with water vapor leaves the saturator 10 through conduit 12. If the water vapor content of said gas is still inadequate for the succeeding shift conversion, additional steam is added through conduit 13.

In a heater 15 the raw gas is heated to the inlet temperature of about 280°–450° C. for the first shift conversion stage. The heated raw gas which contains a surplus of water vapor is fed in conduit 16 to the first shift conversion reactor 17, which contains the known shift conversion catalyst in a fixed bed.

The second partial stream of raw gas is fed through conduit 20 and about one-half of said second partial stream is admixed through conduit 21 with the effluent gas from reactor 17. The mixed gases are at a temperature of about 300°–500° C. and are passed through an additional shift conversion stage, which consists of a second shift conversion reactor 22. The remainder of the second partial stream of raw gas is added through conduit 23 to the effluent gas from reactor 22. The resulting mixed gases are also at a temperature of about 300°–500° C. and are passed through the third shift conversion stage, which consists of the reactor 24. The shift-converted product gas from reactor 24 is fed through conduit 25 to a cooler 26 and is cooled therein in direct contact with cooling water, which is supplied from the saturator 10 in conduit 28. Cooling water which has been reheated in the cooler 26 by a direct heat exchange with the shift-converted product gas is recycled by a pump 30 in conduit 29 to the saturator 10. Water vapor-containing cooled product gas from the shift conversion plant is delivered to its further use through conduit 31.

Some possible modifications of the process shown in the drawing will now be explained. The saturator 10 and the cooler 26 as well as the associated means for recycling the water (conduits 11, 28, 29 and pump 30) may be omitted. This will be particularly desirable when an enriching of water vapor in the shift-converted product gas is not desired and the product gas is fed to its further use through conduit 25. When the saturator 10 is omitted, the conduits 8 and 12 are directly interconnected.

The entire second partial stream of raw gas flowing in conduit 20 may be admixed through conduit 21 so that the conduit 23 can be omitted. In that case the shift conversion is effected only in two stages and the second shift conversion stage consists of the two reactors 22 and 24, which are connected in series. In the embodiment of the process shown on the drawing, comprising a cooler-saturator system, aqueous condensate from the tar separator may be fed through conduit 7a, indicated by a dotted line, to the circulating water in compensation for any water losses.

The invention will be further described in the following illustrative example:

EXAMPLE

It is assumed that 1000 standard m³ of raw gas, on a dry basis, are to be shift-converted in a continuous process. The raw gas contains 597 standard m³ water vapor, 55 kg tar and 8 kg gasoline. The raw gas is at a pressure of 30 bars and a temperature of 182° C. and has the following composition in % by volume:
$CO_2$:2.4
CO:60.0
$H_2$:25.5
$CH_4+N_2$:12.1

That raw gas is shift-converted in a three-stage process of the kind explained with reference to the drawing but without a cooler-saturator system. A first partial stream of 120 standard m³ (on a dry basis) of the gas flowing through conduit 1 is cooled to 150° C. in the cooler 3 so that tar is condensed and the tar content is decreased from 55 g to 10 g per standard m³ of dry raw gas. The hydrocarbons left in the gas have a much lower boiling range.

360.6 standard m³ steam are added to the cooled gas. The gas-steam mixture is heated to 320° C. and is then passed through the first shift conversion stage (reactor 17). The catalyst is a commercially available cobalt-molybdenum catalyst, which is arranged in a fixed bed.

The effluent gas from the first shift conversion stage has the following composition in % by volume:
$CO_2$:37.2
CO:3.0
$H_2$:52.0
$CH_4+N_2$:7.8

The gas contains 270 standard m³ water vapor.

The hydrogen partial pressure has been increased from 2.02 bars in the moist gas to 6.4 bars in the moist gas at the outlet of the first shift conversion stage. 280 standard m³ (on a dry basis) of raw gas, which still contains 167 standard m³ water vapor, are fed through conduits 20 and 21 to the effluent gas from the first shift conversion stage. The raw gas to be admixed is at a temperature of 182° C. and at a pressure of 30 bars and contains 55 g tar and oil and 8 g gasoline per standard m³ of dry raw gas. The resulting mixture of effluent and raw gas has a hydrogen partial pressure of 5.6 bars and when entering the second shift conversion stage (reactor 22) is at a temperature of 360° C. The shift conversion reactor of the second stage is basically designed like the reactor 17 of the first stage.

The remaining raw gas, amounting to 600 standard m³ on a dry basis and containing 358 standard m³ water vapor is added to the effluent gas from the second shift conversion stage. The resulting mixture is fed to the third shift conversion stage (reactor 24) at a temperature of 334° C. That stage is designed like the preceding shift conversion stages. The product gas leaving the third shift conversion stage has the following composition in % by volume:

$CO_2$:31.4
CO:12.4
$H_2$:47.7
$CH_4 + N_2$:8.5

1422 standard m³ of shift-converted gas become available and contain 439 standard m³ water vapor. The gas also contains the partly hydrogenated tar, oil and gasoline constituents. The product gas is indirectly cooled and is then fed to a gas purifier for removal of $CO_2$ and $H_2S$.

It will be appreciated that the instant specification and examples are set forth by way of illustration and not limitation, and that various modifications and changes may be made without departing from the spirit and scope of the present invention.

What is claimed is:

1. In a process for producing a fuel gas from a solid fuel which is gasified under a pressure of about 15-100 bars by a treatment with steam and a gas containing free oxygen, cooling the produced raw gas to a temperature of about 150°-200° C. and saturating it with water vapor, removing condensate which has formed so that the resultant raw gas contains hydrocarbons having a boiling range from about 20° to 400° C. in an amount of about 10-100 g per standard m³ of dry gas and has a $CO:H_2O$ volume ratio of about 0.8-2, and subjecting the raw gas to a shift conversion, the improvement which comprises dividing the raw gas into first and second partial streams in a ratio of about 1:10 to 1:1, feeding the first partial stream with a surplus of water vapor to a first shift conversion stage at an inlet temperature of about 280°-450° C., and passing through at least one subsequent shift conversion stage a mixture of effluent gas from the preceding shift conversion stage and at least part of the second partial stream of raw gas, said second partial stream of raw gas containing the same hydrocarbons as said resultant raw gas, maintaining a pressure of about 15-100 bars in the shift conversion stages, the gas mixture entering each subsequent shift conversion stage being at a temperature of about 300°-500° C. and having a hydrogen content of about 25-35% by volume (related to the moist gas) and a hydrogen partial pressure above 5 bars, and removing fuel gas from the last shift conversion stage.

2. A process according to claim 1, wherein the first partial stream of raw gas is cooled by at least about 10° C., followed by a removal of condensate before the shift conversion.

3. A process according to claim 1, wherein steam is added to the first partial stream before it enters the first shift conversion stage.

4. A process according to claim 1, including the further step of spraying the gas from the last shift conversion stage with water in a cooler thereby to cool the gas, and directly contacting the resulting cooling water with the first partial stream of raw gas in a saturator thereby to supply water vapor to the gas.

5. A process according to claim 4, wherein water for spraying the gas is circulated between the cooler and the saturator, condensate from the raw gas is separated in a tar separator, and aqueous condensate from the tar separator is added to the water which has left the saturator.

6. A process according to claim 1, including a third shift conversion stage, the second partial stream being divided between the second and third stages, the mixture of effluent gas from the second stage and a part of the second partial stream supplied to the third stage being at a temperature in the range of about 300°-500° C.

7. A process according to claim 1, wherein at least 70% of the water vapor stoichiometrically required for the shift conversion of all carbon monoxide contained in the entire raw gas are fed to the first shift conversion stage together with the first partial stream of raw gas.

8. A process according to claim 5, wherein the first partial stream of raw gas is cooled by at least about 10° C., followed by a removal of condensate, before the shift conversion, the gas mixture fed to the first stage containing at least about 70% of the water vapor stoichiometrically required for the shift conversion of all the carbon monoxide contained in the entire raw gas.

9. A process according to claim 1 wherein the raw gas which is fed into the first shift conversion stage and the raw gas fed into a subsequent shift conversion stage contains an impurity of the group tar, oil, gasoline or a phenol.

10. A process according to claim 9 wherein the raw gas which enters the first shift conversion stage and the raw gas which is fed to a subsequent shift conversion stage contains tar.

* * * * *